March 25, 1947.   W. M. HARCUM ET AL   2,417,821
AUTOMATIC PILOT FOR DIRIGIBLE CRAFT
Filed April 26, 1943   4 Sheets-Sheet 1
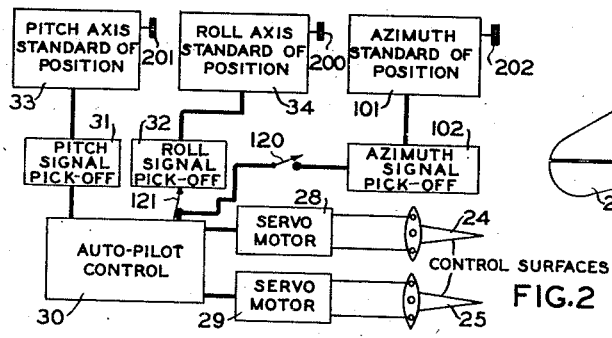
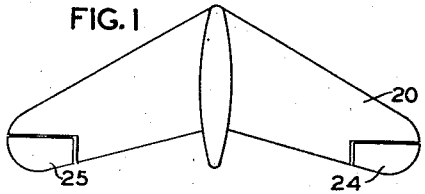
FIG. 1
FIG. 2
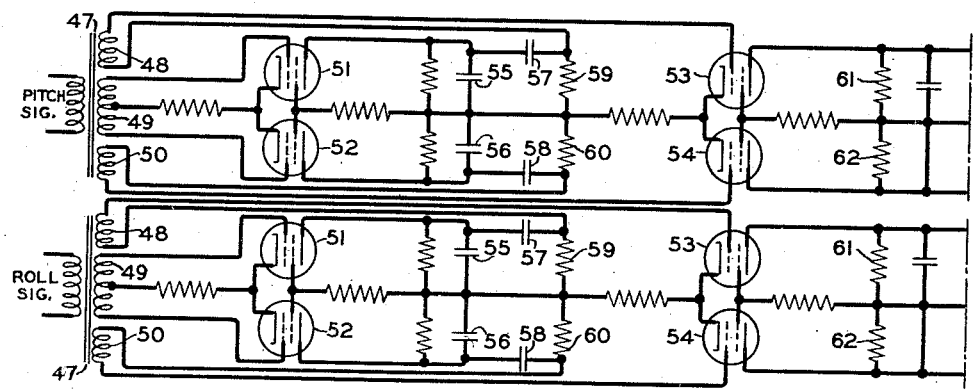
FIG. 3
FIG. 5
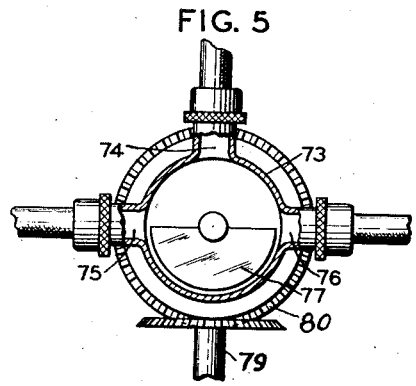
FIG. 4
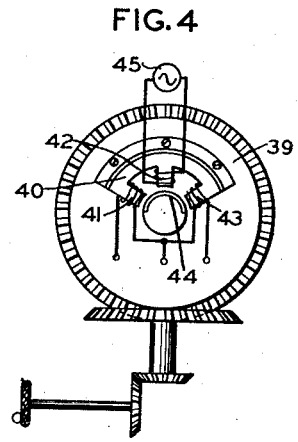
INVENTORS:
W. M. HARCUM
P. HALPERT
BY Herbert H. Thompson
THEIR ATTORNEY

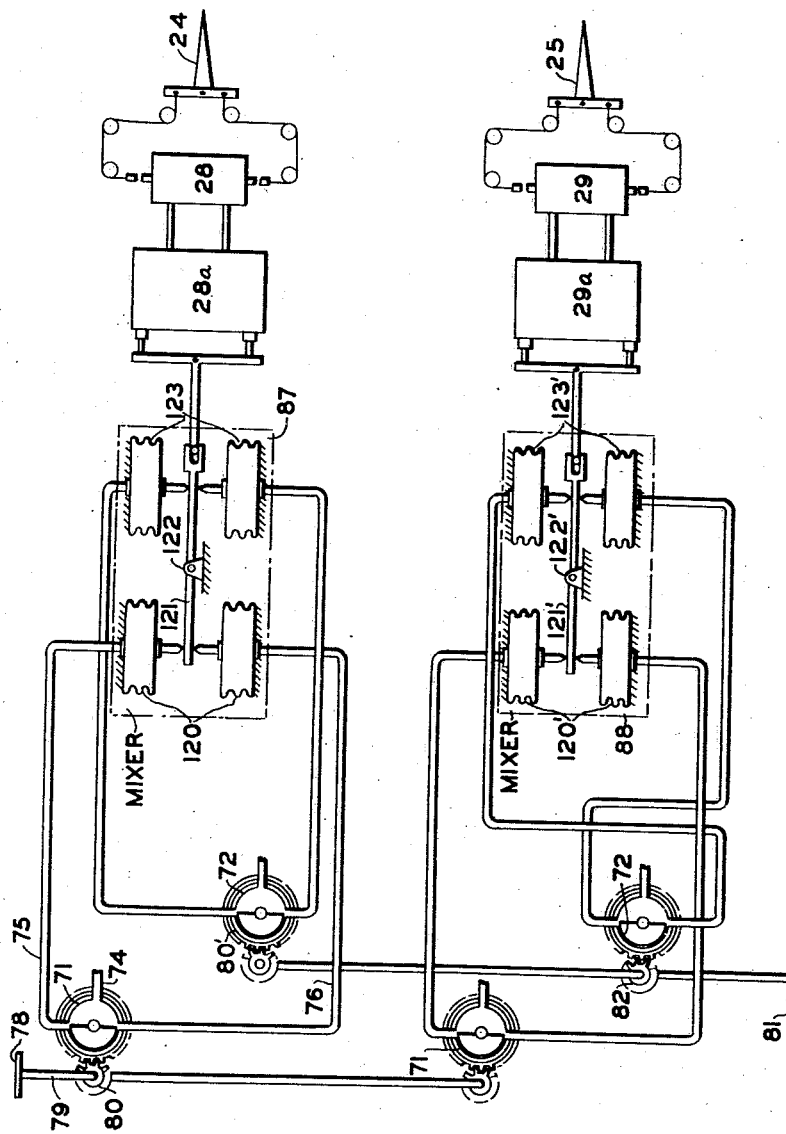

March 25, 1947.  W. M. HARCUM ET AL  2,417,821
AUTOMATIC PILOT FOR DIRIGIBLE CRAFT
Filed April 26, 1943  4 Sheets-Sheet 4
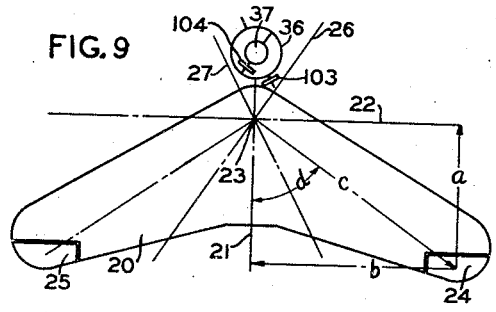
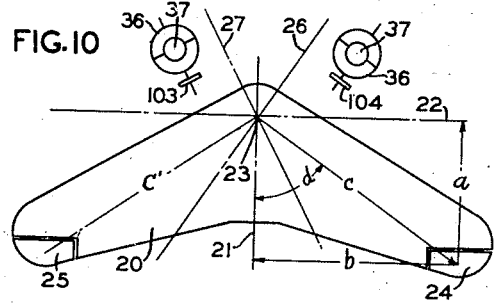
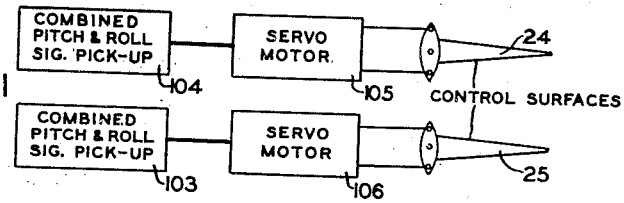
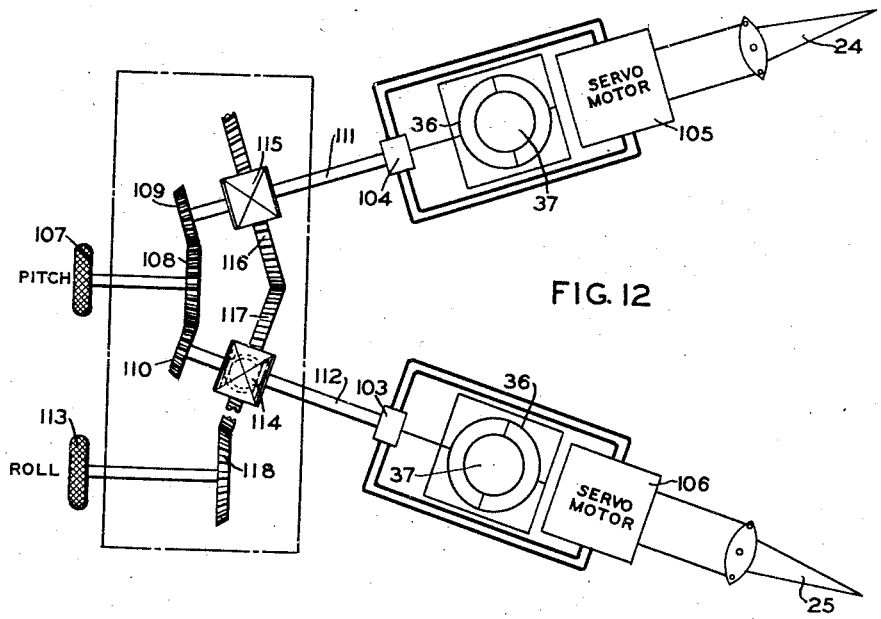
INVENTORS:
W. M. HARCUM
P. HALPERT
BY Herbert A. Thompson
THEIR ATTORNEY Patented Mar. 25, 1947

2,417,821

UNITED STATES PATENT OFFICE 2,417,821

AUTOMATIC PILOT FOR DIRIGIBLE CRAFT

William M. Harcum, Mineola, and Percy Halpert, Kew Gardens, N. Y., assignors to Sperry Gyroscope Company, Inc., a corporation of New York Application April 26, 1943, Serial No. 484,656

11 Claims. (Cl. 244—77)

1

This invention relates to automatic pilots for dirigible craft, and more particularly pertains to pilots for aircraft of the flying wing type having a right and left control surface.

One of the objects of the present invention is to provide an autopilot with a combined pitch and roll signal pick-off that is effective to operate each of the control surfaces of the craft.

A further object of the invention is to provide an automatic pilot operative to move the two control surfaces of an aircraft of this character in the same direction responsive to a controlling pitch signal and in opposite directions responsive to a controlling roll signal.

Another object of the invention is to control each of the servo motors of the pilot by a resultant pitch and roll signal.

A still further object of the invention resides in the combination of pitch, roll and azimuth displacement signals for controlling a dirigible craft of the flying wing type.

Another object of the invention resides in the utilization of a signal producing pick-off for the autopilot whose axis lies in a normally horizontal plane arranged in angularly spaced relation to the fore and aft and athwartship axes of the dirigible craft.

Other objects, features and structural details of the invention will be apparent from the following description when read in relation to the accompanying drawings, wherein Fig. 1 is a plan view of an aircraft of the flying wing type showing the control surfaces therefor.

Fig. 2 is a block diagram illustrating the component parts of the improved automatic pilot.

Figs. 3 and 3A, taken together, present a wiring diagram and schematic view of an autopilot constructed in accordance with the present invention.

Fig. 4 is a detail view of an electromagnet pick-off such as employed to produce the input signal for controlling the circuits of Figs. 3 and 3A.

Fig. 5 is a detail view of a pneumatic type of signal pick-off.

Fig. 7 is a diagram illustrative of a pneumatic form of the invention shown in Fig. 6.

Figs. 9 and 10 are schematic plan views showing different axial arrangements of the pick-offs with reference to the flying wing aircraft.

Fig. 11 is another block diagram of the improved autopilot in which each of the pick-offs employed produce a combined pitch and roll signal, and Fig. 12 is a schematic view of the pilot system shown in Figs. 9 through 11 showing a manual control means for displacing both of the signal producing pick-offs to obtain change in attitude of the craft about its respective pitch and roll axes.

Figure 6:
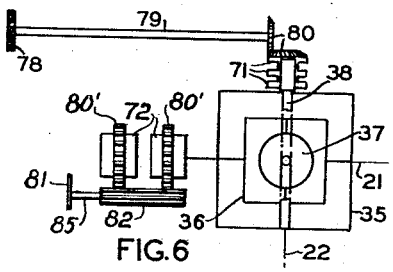
Fig. 6 is a schematic view showing a modification of the invention in which two pick-offs of the character shown in Fig. 5 are utilized at each of the axes of a standard of position such as a conventional gyro vertical.

Figs. 1, 9 and 10 show an aircraft of the flying wing type as generally indicated at 20. The fore and aft axis of this type of dirigible craft is designated at 21 and the athwartship axis is designated at 22. These axes intersect at the center of gravity 23 of the craft and when the craft is free of pitch or roll the axes are situated in a horizontal reference plane provided by a suitable standard of position, such as a gyro vertical. As in other aircraft, the fore and aft axis 21 is the axis about which rolling movement of the craft occurs, and the athwartship axis 22 is the axis about which pitching movement of the craft occurs. The vertical or azimuth axis of the craft is normal to the plane of the paper in Figs. 9 and 10, and passes through the center of gravity 23. This axis, as in conventional craft, is the axis about which turning movement occurs.

The respective right and left control surfaces of the craft are indicated at 24 and 25, these terms being applied in connection with the illustrated position of the surfaces shown in Figs. 1, 9 and 10. Motion of one of the control surfaces, for example surface 24, produces a positive rolling moment proportional to distance $b$ and a positive pitching moment proportional to the distance $a$, where $b$ and $a$ are the respective perpendicular distances between the centroid of the control surface 24 to axis 21 and axis 22 of the craft. A similar movement of surface 25 will obviously produce a corresponding movement about pitch axis 22 and an opposite movement about the roll axis 21. For surface 24, the resultant control moment is proportional to distance $c$ which is the distance between the centroid of the surface and the center of gravity of the craft. Line $c$ is situated at an angle $d$ with respect to the fore and aft axis of the craft.

From this analysis it can be seen that control surface 24 actually controls the dirigible craft about an axis 26 which is in the same plane as axes 21 and 22, passes through the center of gravity 23 of the craft, and is perpendicular to line c. It will be observed that axis 26 lies between the pitch axis 22 and roll axis 21 (following the angles in a counter-clockwise direction). In a similar manner control surface 25 actually controls the craft about an axis 27, which is perpendicular to line c' and lies between the roll axis 21 and the pitch axis 22. Each axis 26 and 27, therefore, has a component about both the roll and pitch axes. In order to obtain movement of the craft about its pitch axis 22, it is necessary to effect corresponding moments about axes 26 and 27 under control of the respective surfaces 24 and 25. To obtain movement of the craft about its roll axis, which also results in turning motion of the craft about its vertical axis, it is necessary to effect opposite moments about the control axes 26 and 27 under control of the respective surfaces 24 and 25. In other words, the control surfaces must be moved in opposite directions to obtain movement of the craft about roll axis 21 and the same surfaces must be moved in like directions to obtain movement of the craft about pitch axis 22.

Accomplishment of this result is obtained in one form of our invention by combining or mixing pitch and roll signals in an autopilot control and utilizing the combination to control the respective servo motors for each of the control surfaces. In accordance with the teaching of the invention, the surfaces 24 and 25 are controlled by independent servo motors, such as respectively indicated at 28 and 29 in Fig. 2. As shown, the two motors 28 and 29 are actuated in response to the mixed signal output of an autopilot control generally designated at 30, whose input is derived from a conventional type of signal pick-off for each of the pitch and roll axes of the craft. The respective pitch and roll signal pick-offs are designated generally at 31 and 32. In accordance with conventional practice, the pitch pick-off is responsive to tilt about this axis of the craft with reference to a standard of position, such as maintained by a gyro vertical or other means. Such a standard of position is generally designated at 33. A similar reference for the roll pick-off is generally designated at 34.

In Fig. 6, the reference instrument that may be employed is schematically shown to include an outer casing 35, gimbal ring 36, and rotor bearing case 37 having a gyro rotor therein whose spin axis is normally vertical. Suitable means of any known character may be employed to maintain the rotor bearing case erect. In such an instrument, the axis of the gimbal ring 36 may correspond with or be parallel to the roll axis of the craft. Also, the axis of the case 37 may correspond with or be parallel to the pitch axis of the craft. Tilt about this last axis may be detected by means of a conventional pivotally mounted bail ring 38, which is positioned by the rotor case 37.

The signal producing means or pick-off employed at each of the axes of the craft may be of the conventional type shown in Fig. 4. Such may include a rotatable plate 39 having a curved magnetic core 40 with three pole pieces 41, 42 and 43 thereon. The outside pole pieces have oppositely connected windings thereon providing a phase sensitive output depending upon the direction of relative angular motion between the core and a curved armature 44 that may be incorporated in the pitch and roll detecting trunnions of the standard of position. The central pole piece of this electromagnetic type of signal pick-off has a winding that is energized by a suitable alternating current source of electrical energy, as indicated at 45. It will be understood, in connection with this form of the invention, that a single pick-off of the character shown in Fig. 4 is employed for the pitch axis 22 and the roll axis 21 of the craft.

Figure 3A:
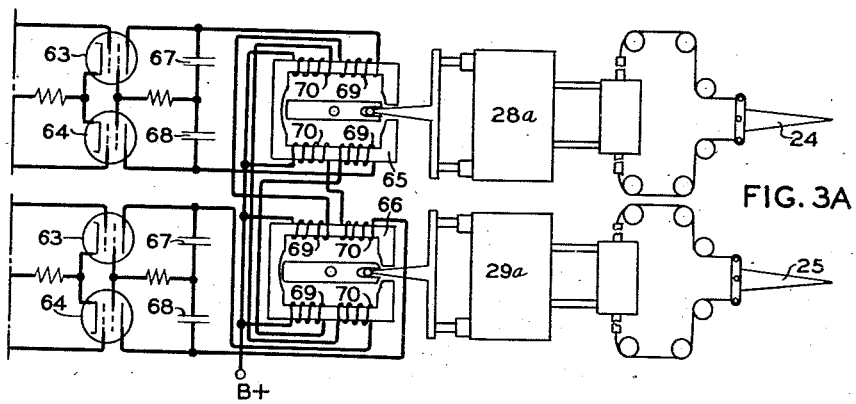

An electro-hydraulic autopilot of the character generally disclosed in the copending application Serial No. 284,642, filed July 15, 1939, by Carl A. Frische, George P. Bentley and Percy Halpert, may be employed to receive the roll and pitch displacement signals for the respective pick-offs, as shown in Fig. 4. As particularly shown in Figs. 3 and 3A, the potential derived from the pitch axis displacement pick-off is applied to the primary winding of an input transformer 47. The current through the primary winding of transformer 47 induces alternating potentials in three secondary windings 48, 49 and 50.

Secondary winding 49 is connected to the control grids of vacuum tubes 51 and 52 in a balanced circuit, while the two secondary windings 48 and 50 are connected to the control grids of vacuum tubes 53 and 54, likewise connected in a balanced circuit. The output of the tubes 51 and 52 is supplied to a resistance condenser network for the purpose of generating a time derivative or rate of the electrical input signal. As shown in the above-noted application, the plate circuits of tubes 51 and 52 are connected to a suitable source of alternating current potential. The output of the circuit consists of an alternating current component and a direct current component, the latter being produced by plate circuit rectification. The alternating current component of the output is substantially reduced by shunt condensers 55 and 56, the capacity of the condensers not being high enough to give the circuit an unduly high time constant. The potential applied to the left-hand plates of condensers 57 and 58, therefore, is without any substantial component of the supply frequency. The direct current potential varies in proportion to the controlling input signal and as the potential varies a varying direct current potential will appear on the right-hand plates of condensers 57 and 58 which is proportional to the rate of change thereof. This derivative or rate potential is applied across resistors 59 and 60 in series with the potentials across transformer windings 48 and 50 to the control grids of the tetrodes 53 and 54. Tubes 53 and 54 rectify the alternating current signal and the combined alternating current and direct current components of the plate current generate corresponding potentials across resistors 61 and 62, which potentials are directly applied to the grids of tubes 63 and 64 without the intermediary of coupling condensers. The amplifier becomes more sensitive when coupling condensers are omitted since the entire value of the direct current signal is applied to the grids of tubes 63 and 64 where, as when condenser coupling is employed, a large part of the signal is lost. It will be seen, therefore, that there is applied to said grids an alternating current signal proportional to the displacement of the pick-off and a direct current signal proportional to the rate of change of displacement of the pick-off, the displacement signal being applied through second transformer windings 48 and 50 while the derivative signal is applied across resistors 59 and 60. Obviously, higher derivatives of the signal may be obained by successive electrical differentiation and combined with the velocity component, as more particularly disclosed in connection with the before noted application for Letters Patent.

Tubes 53 and 54 are directly coupled to balanced output tubes 63 and 64 and the rectified output of the tubes 63 and 64 is supplied equally to torque motors 65 and 66, the condensers 67 and 68 serving to reduce ripple in the output. The series connected pitch signal output windings of the torque motors for each of the hydraulic servo motors 28a and 29a are arranged to effect operation thereof in the same direction, so that when surface 24 moves up, as viewed in Fig. 3A, surface 25 moves up likewise. The roll signal receiving network shown is identical to that described in connection with the pitch signal. In this instance, the series connected roll signal output windings of the torque motors 65 and 66 for each of the servo motors are arranged to effect operation thereof in opposite directions, so that when surface 24 moves up, as viewed in Fig. 3A, surface 25 will move in the opposite direction with the same displacement. The windings of the respective torque motors provide a means for mixing or combining the respective pitch and roll signals to obtain two resultant signals of equal magnitude which are effective to control the control surfaces 24 and 25. One of the resultant signals corresponds to the sum of the pitch and roll signals divided by two, and the other the difference between the pitch and roll signals divided by two. Then with zero roll signal, the controlling pitch signal for each servo motor is plus the magnitude of the original signal divided by two. With zero pitch signal, the controlling roll signal for one of the servo motors is plus the magnitude of the original signal divided by two and the other is minus the magnitude of the original signal divided by two. The torque motors 65 and 66 and the hydraulic servo motors are generally of the character described in detail in the before-mentioned application for Letters Patent. The oppositely disposed windings for the torque motors 65 and 66 energized by the output roll signal are designated at 70. The unidirectional movement producing windings 69 of the torque motors are energized by the output of the pitch signal circuit network. Inasmuch as the elements of the roll signal receiving network are similar to those described in connection with the pitch signal circuit network, corresponding reference numbers are employed therein to designate the parts. Each of the servo motors 28a and 29a is controlled by the combined output of the roll and pitch signal producing means.

The mixing of the control signals may be effected pneumatically as well as electrically, as particularly shown in Figs. 5, 6 and 7. In this instance, two pick-offs may be employed at each of the axes of the craft, the pitch pick-offs being indicated at 71 and the roll pick-offs at 72. The pick-offs may be of the type shown in Fig. 5, in which the parts are provided by a tubular case having a suction outlet port 74 and two variable ports 75 and 76. The other part of the pick-off is a baffle 77 that differentially intercepts the flow of air through the ports 75 and 76. Baffle 77 may be positioned by the gyro vertical and the casing 73 is mounted to be angularly displaceable with respect to the same. Flexible hose cables, or other connections permitting angular adjustment, are connected to the movable casing 73. As shown in Fig. 6, the cases of the pick-offs 71 are moved together and in the same direction by means of setting knob 78 through shaft 79 and gears 80. Likewise, knob 81 is arranged to move the cases of the roll pick-offs 72 in the same directions, through gears 82 and 80' on the housings of valves 72, since the connections of the valves to the mixers are reversed, as hereinafter explained. Fig. 7 indicates the arrangement of the pick-offs in the autopilot system, servo motors 28 and 29 being controlled by the combined output of individual pitch and roll signal pick-offs 71 and 72. Suitable pressure mixers 87 and 88 are utilized to combine the respective signals of the pick-offs in a manner which is the pneumatic equivalent of the electrical differential system described in connection with the description of Fig. 3A, the resultant outputs being employed to directly control the motors 28 and 29. As shown, the output of one of the pitch valves 71 is connected to opposing bellows 120, 120 which oppositely engage a spring centralized arm 121 pivoted at 122. Near the opposite ends of said arm are a pair of opposed bellows 123 and 123 connected to the output of one of the roll pick-offs 72. The movement of said arm, therefore, is under the control of the combined pitch and roll pick-offs and such movement governs the position of the relay valve 28a of the servo motor 28, as in Fig. 3A. Similarly, the output of the other pick-off valve 71 is connected in like manner to the bellows 120' and 120' acting oppositely on the spring lever 121', while the output of the second roll valve 72 is connected to the bellows 123', but in the reverse direction to the connections of the valve 72 to bellows 123.

Figure 8:
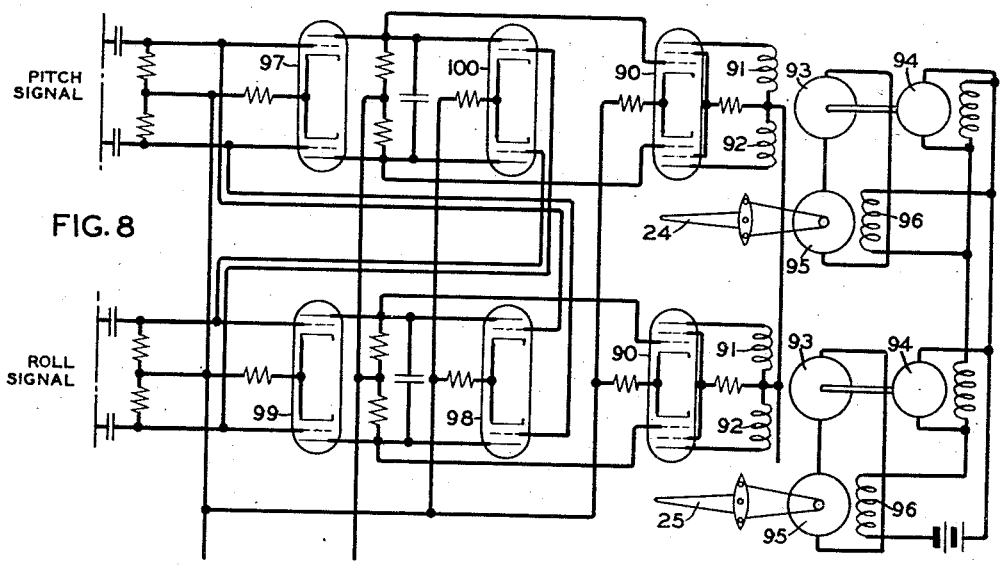
Fig. 8 is a circuit showing a modification of the form of the invention illustrated in Figs. 3 and 3A.

In the form of the invention shown in Fig. 8, a motor generator control of the surfaces 24 and 25 is employed that is similar in character to that particularly shown in the copending application of P. Halpert, C. A. Frische, J. L. Bird and O. E. Esval, for Positional control systems, Serial No. 448,040, filed June 22, 1942. In this disclosure, the output of tube 90 is employed to energize the balanced field windings 91 and 92 of generator 93. The armature of the generator is driven at a constant speed by motor 94. The output voltage of the generator 93 is fed to the armature of a direct current motor 95, whose field winding 96 has a fixed excitation from a suitable direct current source. The armature resistance of the motor 95 is matched to that of the generator 93 so as to provide maximum power transfer therebetween. Motor 95 will turn surface 24 at a speed corresponding to combined voltages at the generator and in a direction determined by the phase of the controlling input signal to the generator. The elements for controlling surface 25 are similar in character to those already described, and are consequently given corresponding reference numbers.

In this instance, output tubes 90 are supplied by two parallel stages of amplification, each of which receives one-half the signal of the pitch circuit network and the roll circuit network. Duo-triodes 97 and 98 receive the pitch input signal and duo-triodes 99 and 100 receive the roll input signal, the connections being such that the control surfaces 24 and 25 respond in the manner described in detail in connection with the description of Figs. 3 and 3A.

As shown schematically in Fig. 2, the craft may also be controlled with reference to its roll axis 21 by means of an azimuth standard of position of a suitable character, such as a directional gyroscope, diagrammatically indicated at 101, and an azimuth signal pick-off 102 of the type shown in either Fig. 4 or Fig. 5. Such a signal may take the place of the roll signal pick-off.

It will be understood that the flying wing of our invention may be controlled in azimuth as well as about the other axes because of the well known fact that an aircraft always tends to turn when it banks. Therefore the azimuth control may be effected entirely by adjusting the aircraft for a predetermined bank through a bank knob 200. A similar knob 201 is shown on the pitch standard of position for controlling the pitch through the gyroscope, as is well known in the art.

In Fig. 2 we also show the azimuth standard of position 101 for normally maintaining course, having the usual azimuth signal pick-off 102, which may be of the type shown in either Fig. 4 or Fig. 5. Since we have shown the flying wing with no rudder, we lead the signal from 102 into the same point in the autopilot control as the signal from 34, so that the signal from each is effective to cause a banked turn. When a controlled turn is desired, therefore, the operator adjusts the change course knob 202 on the azimuth standard of position or gyro 101 to cause a predetermined turn, or drives the shaft of said knob 202 at a selected rate to cause a proportional selected rate of turn of the craft, as well understood in the art. In order to prevent interference from the anti-roll device 24 at this time, a switch 121 between the roll signal pick-off and the automatic pilot should be opened, or the knob 200 adjusted at the same time as knob 202. Similarly, when knob 200 is adjusted to cause a predetermined bank, either knob 202 should be rotated at a rate proportional to such predetermined bank, or a switch 120 opened between the azimuth signal pick-off 102 and the autopilot control 33, so that the azimuth standard of position will not buck the signal from the horizontal standard of position. It is interesting to note that according to our invention a correctly banked turn will substantially always be obtained, since the turn control operates entirely through the differentially affected control surfaces which in this instance serve as ailerons, the turn being caused by the bank, since in correctly designed aircraft the banking angle will be correct for the rate of turn caused thereby.

In the form of the invention shown in Figs. 9, 10, 11 and 12, the signal producing pick-offs employed as indicated generally at 103 and 104 provide a combined pitch and roll signal output. Pick-off 103 is responsive to tilt about the axis 27 of the craft, while pick-off 104 responds similarly to tilt about the axis 26. In Fig. 9, the standard of position in which the pick-offs are located is a gyro vertical whose major and minor axes are angularly positioned with relation to the fore and aft and athwartship axes of the craft, are preferably parallel to or in line with the aforesaid axes 26 and 27, and provide the axes of the respective signal producing pick-offs. Pick-off 103 at the major axis of the gyro vertical provides a signal responsive to tilt about axis 27 of the craft. Pick-off 104 at the minor axis of the gyro vertical provides a signal responsive to tilt about axis 26 of the craft. In Fig. 10, two gyro verticals are employed with the pick-offs 103 and 104, respectively, at the major axes thereof, which axes are situated in parallel relation to craft axes 27 and 26. It will be understood that pick-off 104 controls the control surface 24 and that pick-off 103 controls the control surface 25. As shown in Fig. 11, the directly combined pitch and roll signal pick-offs 103 and 104 each provide an independent signal that is utilized with a separate servo motive means 105 and 106 to obtain the desired correlated results.

As shown in Fig. 12, this type of pick-off may be manually set from a pitch knob 107 through bevel gears 108, 109 and 110 by way of shafts 111 and 112. To effect opposite motion of the shafts 111 and 112 under control of roll knob 113, two differentials 114 and 115 may be employed. The differentials are connected by gears 116 and 117 which are positioned by the roll knob 113 by way of gear 118. It will be understood that gears 116 and 117 are respectively mounted on the casing of differentials 115 and 114.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. An automatic pilot for aircraft of the flying wing type having a right and left control surface, motive means for controlling the right surface, motive means for controlling the left surface, attitude reference means including signal means responsive to pitch and signal means responsive to roll, means for mixing the signals of the respective signal means to obtain two resultant signals which are functions of the sum of the pitch and roll signals and of the difference of the pitch and roll signals, and means for controlling one of the motive means by one of the resultant signals and for controlling the other of the motive means by the other of the resultant signals.

2. An automatic pilot for aircraft having a right control surface that produces a moment about both the pitch and roll axes of the craft and a left control surface that produces a moment about both the pitch and roll axes of the craft, control means for each of the control surfaces responsive to both pitch and roll movements of the craft, attitude reference means governing said control means in response to pitch and roll of the craft, servo means for controlling the right surface responsive to one of the control means, and servo means for controlling the left surface responsive to the other of said control means.

3. An automatic pilot for aircraft of the flying wing type having a right and left control surface, means for controlling the right surface including a signal producing means responsive to tilt about an axis having both fore and aft and athwartship components, means for controlling the left surface including a signal producing means responsive to tilt about an axis at a substantial angle to the aforesaid axis and having components about fore and aft and athwartship axes of the craft, pitch settable means for the respective signal producing means to obtain movement of the surfaces in the same direction in controlling the craft about its pitch axis, and roll settable means for the respective signal producing means to obtain movement of the surfaces in opposite directions in controlling the craft about its roll axis.

4. An automatic pilot for aircraft having a right and left control surface and a servo motor for each, a signal producing means responsive to tilt about the fore and aft axis of the craft and a signal producing means responsive to tilt about the athwartship axis of the craft, means for mixing the signals of the respective producing means for controlling the right surface, means for mixing the signals of the respective producing means for controlling the left surface, pitch settable means for moving the respective athwartship effective signal producing means in the same direction, and roll settable means for moving the respective fore and aft effective signal producing means in opposite directions.

5. In an automatic pilot for aircraft having right and left control surfaces, means for differentially controlling said surfaces to bank the craft and thereby cause the same to turn, an attitude maintaining device normally controlling said means to maintain level flight, a course maintaining standard of position including course changing means, means responsive to said course changing means for operating said differential controlling means to cause a banked turn, and means for preventing interference from said attitude reference device during such banked turn.

6. An automatic pilot for aircraft of the flying wing type having a right control surface and left control surface, means for producing a signal responsive to tilt of the craft about the roll axis thereof, means for producing a signal responsive to tilt of the craft about the pitch axis thereof, means for combining the signals of the respective signal producing means to obtain two resultant signals corresponding to a function of the sum of the pitch and roll signals and a function of the difference of the pitch and roll signals, servo means for one of the control surfaces responsive to one of the resultant signals, and servo means for the other of the control surfaces responsive to the other of the resultant signals.

7. An automatic pilot for aircraft having a right control surface and a left control surface comprising motive means operatively connected to the right surface, motive means operatively connected to the left surface, attitude reference means including signal producing means responsive to both pitch and roll movements of the craft for each of said motive means, means for controlling the motive means for the right surface by the output of one of said signal producing means, and means for controlling the motive means for the left surface by the output of the other of said signal producing means.

8. An automatic pilot for aircraft of the flying wing type having a right control surface and a left control surface comprising independent motive means operatively connected to the respective surfaces, attitude reference means including means for producing two pitch signals and means for producing two roll signals, means for combining the signals of the respective producing means to obtain two resultant signals corresponding to a function of the sum of one of the pitch and one of the roll signals and a function of the difference of the other pitch and the other roll signals, means for controlling the motive means for the right surface by the first of the resultant signals, and means for controlling the motive means for the left surface by the other of the resultant signals.

9. In an automatic pilot for aircraft of the flying wing type, a control surface on the trailing edge of one wing producing a moment about an axis normal to a line connecting the centroid of said control surface and the center of gravity of the craft, a gyro-vertical mounted with one of its axes parallel to said first-named axis and having signal producing means responsive to tilt about said gyro vertical axis, and a servo motor governing the position of said control surface controlled by said signal.

10. An automatic pilot for aircraft of the flying wing type having right and left control surfaces that produce, respectively, moments about different axes lying normal to lines connecting the centroids of the surfaces and the center of gravity of the craft, respectively, a gyro-vertical means having a first axis parallel to one of said first-named axes and a second axis parallel to the other of said first-named axes, signal means on said gyro-vertical producing a signal upon tilt of the craft with respect to said gyro about each of said gyro vertical axes, means responsive to one of said signal means for controlling the right control surface, and means responsive to the other of said signal means for controlling the left control surface.

11. In an automatic pilot for aircraft having a right control surface and a left control surface, a course maintaining standard of position having a course change means, a horizontal standard of position to prevent the craft from pitching, signal generating means for each standard of position, means for combining the signals of the respective generating means to obtain two resultant signals corresponding to a function of the sum of the pitch and course signals and a function of the difference of the pitch and course signals, servo means for operating the right control surface responsive to one of the resultant signals, and servo means for operating the left control surface responsive to the other of the resultant signals.

WILLIAM M. HARCUM.
PERCY HALPERT.

REFERENCES CITED

The following references are of record in the file of this patent:

UNITED STATES PATENTS

| Number | Name | Date |
|---|---|---|
| 2,191,842 | Back | Feb. 27, 1940 |
| 2,162,862 | Protzen | June 20, 1939 |
| 2,210,916 | Kenyon et al. | Aug. 13, 1940 |
| 2,310,954 | Hodgman | Feb. 16, 1943 |
| 2,137,974 | Fischel | Nov. 22, 1938 |
| 2,351,977 | Kronenberger et al. | June 20, 1944 |